United States Patent
Huang et al.

(10) Patent No.: US 11,513,374 B2
(45) Date of Patent: Nov. 29, 2022

(54) DISPLAY PANEL AND DISPLAY DEVICE

(71) Applicant: HUIZHOU CHINA STAR OPTOELECTRONICS TECHNOLOGY CO., LTD, Guangdong (CN)

(72) Inventors: Dongchen Huang, Guangdong (CN); Yuexia Lin, Guangdong (CN); Hongji Li, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 323 days.

(21) Appl. No.: 16/620,882

(22) PCT Filed: Nov. 8, 2019

(86) PCT No.: PCT/CN2019/116514
§ 371 (c)(1),
(2) Date: Dec. 10, 2019

(87) PCT Pub. No.: WO2021/082046
PCT Pub. Date: May 6, 2021

(65) Prior Publication Data
US 2021/0124192 A1    Apr. 29, 2021

(30) Foreign Application Priority Data
Oct. 28, 2019  (CN) .......................... 201911027744.1

(51) Int. Cl.
*G02F 1/1335*   (2006.01)
*G02F 1/01*     (2006.01)
*G02F 1/1368*   (2006.01)

(52) U.S. Cl.
CPC .......... *G02F 1/0126* (2013.01); *G02F 1/0102* (2013.01); *G02F 1/133528* (2013.01); *G02F 1/1368* (2013.01); *G02F 1/133504* (2013.01)

(58) Field of Classification Search
CPC ............ G02F 1/1335; G02F 1/133504; G02F 1/133507; G02F 1/133512;
(Continued)

(56) References Cited

U.S. PATENT DOCUMENTS

2004/0240070 A1* 12/2004 Suzuki .................... G02B 1/111
 359/599
2007/0047058 A1*  3/2007 Lim ..................... H04N 13/359
 359/267

(Continued)

FOREIGN PATENT DOCUMENTS

CN    104914498 A    9/2015
CN    105572782 A    5/2016
(Continued)

Primary Examiner — Thoi V Duong
(74) Attorney, Agent, or Firm — Mark M. Friedman

(57) ABSTRACT

The present invention provides a display panel and a display device. The display panel includes an array substrate, a color film substrate disposed on the array substrate, and a photochromic glass layer disposed on the color film substrate. A color change region is formed when an ultraviolet laser irradiates the photochromic glass layer, and the color change region filters passing lights. The display panel further includes a plurality of scattered particles distributed on the photochromic glass layer.

3 Claims, 2 Drawing Sheets

(58) Field of Classification Search
CPC ......... G02F 1/133514; G02F 1/133528; G02F 1/0126; G02F 1/0102; G02F 1/1368; G02F 1/1362; G02F 2202/14
See application file for complete search history.

(56) References Cited

U.S. PATENT DOCUMENTS

| | | | |
|---|---|---|---|
| 2007/0171355 A1* | 7/2007 | Chung | G02F 1/133528 349/194 |
| 2010/0134705 A1* | 6/2010 | Jabri | C03B 32/00 349/8 |
| 2010/0156765 A1* | 6/2010 | Park | G02B 5/23 345/77 |
| 2013/0107173 A1* | 5/2013 | Takeda | G02B 5/3025 349/96 |
| 2017/0261807 A1 | 9/2017 | Jiang et al. | |
| 2018/0120648 A1 | 5/2018 | Kim et al. | |
| 2018/0149915 A1 | 5/2018 | Han et al. | |
| 2019/0101790 A1 | 4/2019 | Liao et al. | |
| 2019/0318688 A1* | 10/2019 | Kondo | G09G 3/3225 |

FOREIGN PATENT DOCUMENTS

| | | | | |
|---|---|---|---|---|
| CN | 107608115 A | | 1/2018 | |
| CN | 108008562 A | | 5/2018 | |
| CN | 108121113 A | | 6/2018 | |
| CN | 207867180 U | | 9/2018 | |
| JP | 2001-194626 | * | 7/2001 | ........... G02F 1/1335 |

* cited by examiner

DISPLAY PANEL AND DISPLAY DEVICE

FIELD OF INVENTION

The present disclosure relates to the display technology field, and more particularly, to a display panel and a display device.

BACKGROUND OF INVENTION

Along with development of display technologies, liquid crystal displays (LCDs) are widely used in various consumer electronic products such as mobile phones, televisions, personal digital assistants, digital cameras, notebook computers, desktop computers, etc., due to advantages such as high image quality, power saving, thin body, and wide application ranges, and have become mainstream in display devices.

Among them, conference-integrated machines and electronic whiteboards applied in commercial displays have wide market demand. LCD display devices have visible features of laser pointers for the conference-integrated machines and electronic whiteboards to achieve meeting interaction.

However, in traditional display modules, due to a high reflectivity of liquid crystal display surfaces, laser pointers are mainly specular reflections and transmissions on the surfaces, resulting in poor visibility of the laser pointers in all directions. In a perspective of specular reflection, laser pointers easily cause glare to users. Meanwhile, transmitted light accounts for more than 90% of all light, and specular reflections also occur, resulting in poor user experience.

SUMMARY OF INVENTION

In traditional display modules, due to a high reflectivity of liquid crystal display surfaces, laser pointers are mainly specular reflections and transmissions on the surfaces, resulting in poor visibility of the laser pointers in all directions. In a perspective of specular reflection, laser pointers easily cause glare to users. Meanwhile, transmitted light accounts for more than 90% of all light, and specular reflections also occur, resulting in poor user experience.

The present disclosure provides a display panel and a display device. A photochromic glass layer is disposed in a display panel, so that the photochromic glass layer produces discoloration and acts as a filter when laser pointers irradiate the display panel. It resolves technical problems that the laser pointers irradiate the display panel to cause reflection and transmission affecting the user's viewing and display in the prior art.

To resolve above problems, the present disclosure provides technical schemes as below.

The present disclosure provides a display panel, the display panel comprises an array substrate, a color film substrate disposed on the array substrate, a photochromic glass layer disposed on the color film substrate, and a color change region is formed when an ultraviolet laser irradiates the photochromic glass layer, and a plurality of scattered particles distributed on the photochromic glass layer.

In one embodiment of the present disclosure, the photochromic glass layer comprises a photochromic glass, and a polarizer attached to one side of the photochromic glass away from the array substrate.

In one embodiment of the present disclosure, a material of the photochromic glass comprises at least one of borate glass doped with silver halide, copper halide or cadmium halide, borate glass doped with silver molybdate or silver tungstate, or silicate glass activated by rare earth ions.

In one embodiment of the present disclosure, the photochromic glass layer comprises a glass substrate, and a photochromic polarizer attached to one side of the glass substrate away from the array substrate.

In one embodiment of the present disclosure, the photochromic polarizer comprises a pressure sensitive adhesive, a first laminated film, a polarizing layer, a second laminated film, a photochromic layer, and a protective layer sequentially disposed on the glass substrate.

In one embodiment of the present disclosure, a material of the photochromic layer comprises an organic photochromic material or an inorganic photochromic material. Wherein, the organic photochromic material comprises spiropyran, chlorpyrifos, or diarylethene, and the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

In one embodiment of the present disclosure, the photochromic glass layer comprises a glass substrate, and a photochromic film and a polarizer sequentially disposed on one side of the glass substrate away from the array substrate.

In one embodiment of the present disclosure, a material of the photochromic film comprises an organic photochromic material or an inorganic photochromic material. Wherein, the organic photochromic material comprises spiropyran, chlorpyrifos, or diarylethene, and the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

In one embodiment of the present disclosure, the scattered particles are disposed on a surface of one side of the photochromic glass layer facing away from the array substrate, and a material of the scattered particles comprise silica or polymethyl methacrylate.

According to above purposes, the present disclosure provides a display device comprising a display panel, the display panel comprises an array substrate, a color film substrate disposed on the array substrate, a photochromic glass layer disposed on the color film substrate, and a color change region is formed when an ultraviolet laser irradiates the photochromic glass layer, and a plurality of scattered particles distributed on the photochromic glass layer.

In one embodiment of the present disclosure, the photochromic glass layer comprises a photochromic glass, and a polarizer attached to one side of the photochromic glass away from the array substrate.

In one embodiment of the present disclosure, a material of the photochromic glass comprises at least one of borate glass doped with silver halide, copper halide or cadmium halide, borate glass doped with silver molybdate or silver tungstate, or silicate glass activated by rare earth ions.

In one embodiment of the present disclosure, the photochromic glass layer comprises a glass substrate, and a photochromic polarizer attached to one side of the glass substrate away from the array substrate.

In one embodiment of the present disclosure, the photochromic polarizer comprises a pressure sensitive adhesive, a first laminated film, a polarizing layer, a second laminated film, a photochromic layer, and a protective layer sequentially disposed on the glass substrate.

In one embodiment of the present disclosure, a material of the photochromic layer comprises an organic photochromic material or an inorganic photochromic material. Wherein, the organic photochromic material comprises spiropyran, chlorpyrifos, or diarylethene, and the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

In one embodiment of the present disclosure, the photochromic glass layer comprises a glass substrate, and a photochromic film and a polarizer sequentially disposed on one side of the glass substrate away from the array substrate.

In one embodiment of the present disclosure, a material of the photochromic film comprises an organic photochromic material or an inorganic photochromic material. Wherein, the organic photochromic material comprises spiropyran, chlorpyrifos, or diarylethene, and the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

In one embodiment of the present disclosure, the scattered particles are disposed on a surface of one side of the photochromic glass layer facing away from the array substrate, and a material of the scattered particles comprise silica or polymethyl methacrylate.

Compared with prior art, in order to resolve above problems, a photochromic glass layer is disposed in a display panel, and a color change region is formed when a laser irradiates the display panel. The color change region filters passing lights so that a preset color appears in the color change region. Then, the passing lights are scattered by scattering particles to reduce a glare phenomenon of the specular reflection angles, and a diffuse reflection of laser pointers at a wide-angle is increased to form a wide-angle visible laser point, thereby achieving the wide-angle visibility of the laser pointers.

DESCRIPTION OF DRAWINGS

In order to more clearly illustrate the technical solutions of the embodiments of the present invention, the drawings used in the description of the embodiments will be briefly described as below. Obviously, the drawings described as below are just some embodiments of the present invention. For one of ordinary skill in the art, under the premise of no creative labor, other drawings can also be obtained according to these drawings.

DETAILED DESCRIPTION OF PREFERRED EMBODIMENTS

The following description of the embodiments with reference to the appended drawings is used for illustrating specific embodiments which may be used for carrying out the present disclosure. The directional terms described by the present disclosure, such as "upper", "lower", "front", "back", "left", "right", "inner", "outer", "side", etc., are only directions by referring to the accompanying drawings. Thus, the adopted directional terms are used to describe and understand the present disclosure, but the present disclosure is not limited thereto. In figures, elements with similar structures are indicated by the same numbers.

The present disclosure is directed to existing display panels and display devices. Since specular reflection and transmission will occur when laser pens irradiate display panels, visibility of laser pointers in all directions is poor, thereby affecting display. The present embodiments can resolve the above defects.

An embodiment of the present disclosure provides a display panel to resolve the above defects. The display panel comprises an array substrate, a color film substrate disposed on the array substrate, and a photochromic glass layer disposed on the color film substrate. A color change region is formed when an ultraviolet laser irradiates the photochromic glass layer, and a plurality of scattered particles are distributed on the photochromic glass layer.

Figure 1:
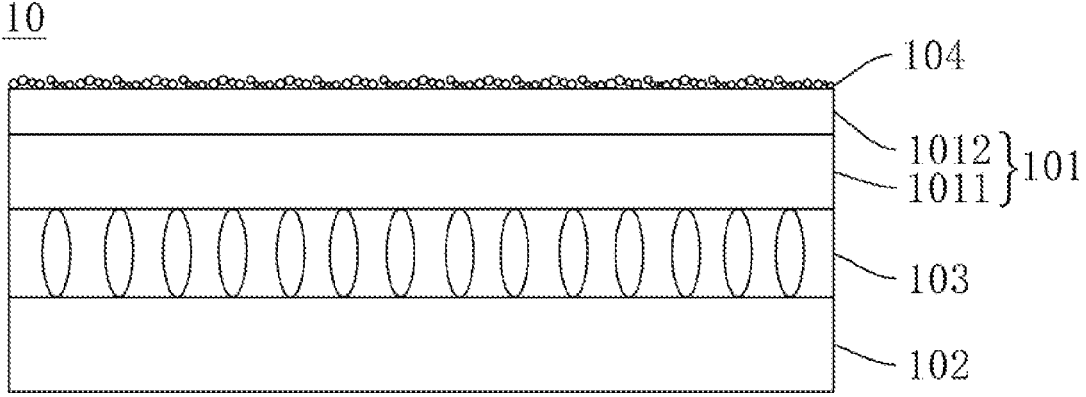
FIG. 1 is a schematic structural diagram of a display panel provided by an embodiment of the present disclosure.

Specifically, referring to FIG. 1, the display panel 10 comprises an array substrate 102, a color film substrate disposed on the array substrate 102, and a liquid crystal layer 103 disposed between the array substrate 102 and the color film substrate.

Wherein, a photochromic glass layer 101 is disposed on the color film substrate, and a color change region is formed when an ultraviolet laser irradiates the photochromic glass layer 101. The color change region filters passing lights.

In addition, a plurality of scattered particles 104 are distributed on one side of the photochromic glass layer 101 facing away from the array substrate 102 to scatter the passing lights.

In the actual application process, due to a high reflectivity of liquid crystal display surfaces, laser pointers are mainly specular reflections and transmissions on the surfaces, resulting in poor visibility of laser pointers in all directions. In a perspective of specular reflection, laser pointers 90% of all light, and specular reflections may occur, resulting in poor user experience. In the display panel provided by the embodiment of the present disclosure, a photochromic glass layer is disposed in the display panel, and a color change region is formed when a laser irradiates the display panel. The color change region filters passing lights. Then, the passing lights are scattered by scattering particles to form a wide-angle visibility, resolving a glare phenomenon of the specular reflection angles, and increasing a diffuse reflection of laser pointers at a wide-angle, thereby achieving wide-angle visibility of laser pointers.

Further, a photochromic structure is disposed in the photochromic glass layer. The photochromic structure comprises a photochromic glass, a photochromic polarizer, or a photochromic film, that is, the photochromic structure may be any one of the above color changing structure devices or other feasible device to achieve technical effects of wide-angle visibility of the laser pointers according to the embodiment of the present disclosure.

As shown in FIG. 1, the scattered particles 104 are disposed on a surface of one side of photochromic glass layer 101 facing away from the array substrate 102, and a material of the scattered particles 104 comprises silica or polymethyl methacrylate.

The structure of the photochromic glass layer will be described below in combination with specific embodiments.

Embodiment 1

Referring to FIG. 1, the display panel 10 comprises an array substrate 102 and a color film substrate relatively disposed, and a liquid crystal layer 103 disposed between the array substrate 102 and the color film substrate.

The display panel 10 further comprises a photochromic glass layer 101 disposed on the color film substrate.

In the present embodiment, the photochromic glass layer 101 comprises a photochromic glass 1011, and a polarizer 1012 attached to one side of the photochromic glass 1011 away from the array substrate 102.

Wherein a material of the photochromic glass 1011 comprises at least one of borate glass doped with silver halide, copper halide or cadmium halide, borate glass doped with silver molybdate or silver tungstate, or silicate glass activated by rare earth ions.

In addition, a plurality of scattered particles 104 are distributed on one side of the photochromic glass layer 101 away from the array substrate 102 to scatter passing lights.

A material of the scattered particles 104 comprises silica or polymethyl methacrylate.

It should be noted that the display panel 10 mentioned above only shows the array substrate 102 and the color film substrate. These structural layers are only a brief description of a partial structure and components of the display panel, but are not limited thereto. For example, the color film substrate comprises a black matrix (BM), an RGB color resistance layer, etc., and the array substrate 102 comprises a TFT switch, a scanning line, a data line, a pixel electrode, a common electrode, etc. The display panel 10 further comprises other display components, such as an alignment film, a frame glue, etc. that are disposed between the array substrate 102 and the color film substrate. These details can be implemented by referring to the prior art, and are not described herein again.

In summary, the photochromic glass 1011 is used as a glass substrate on a side of the color film substrate, so that the photochromic glass 1011 undergoes photochromic conversion under irradiation of ultraviolet laser. When the passing lights in the display panel 10 go through the photochromic glass 1011, the color change region filters the passing lights. Then, the passing lights go through the scattering particles 104 to form wide-angle visibility, thereby forming a visible laser point of laser pointers and achieving visible display of the laser pointers.

Embodiment 2

Figure 2:
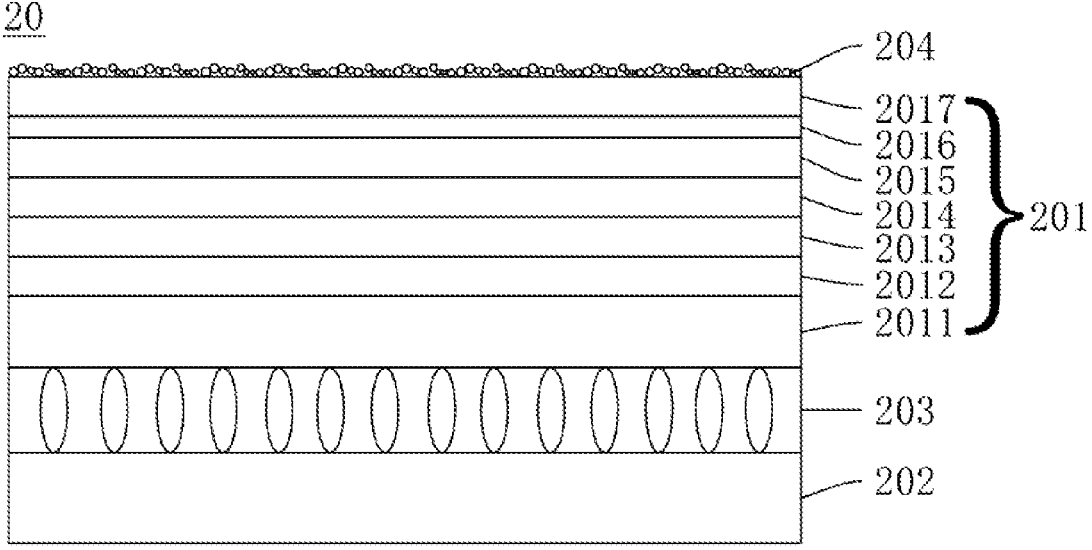
FIG. 2 is a schematic structural diagram of another display panel provided by an embodiment of the present disclosure.

Referring to FIG. 2, a display panel 20 comprises an array substrate 202 and a color film substrate relatively disposed, and a liquid crystal layer 203 disposed between the array substrate 202 and the color film substrate.

The display panel 20 further comprises a photochromic glass layer 201 disposed on the color film substrate.

In the present embodiment, the photochromic glass layer 201 comprises a glass substrate 2011, and a photochromic polarizer attached to one side of the photochromic glass 2011 away from the array substrate 202.

The photochromic polarizer comprises a pressure sensitive adhesive 2012, a first laminated film 2013, a polarizing layer 2014, a second laminated film 2015, a photochromic layer 2016, and a protective layer 2017 sequentially disposed on the glass substrate 2011.

Wherein, a material of the photochromic layer 2016 comprises an organic photochromic material or an inorganic photochromic material. The organic photochromic material comprises spiropyran, chlorpyrifos, or diarylethene, and the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

The photochromic materials are reversible photochromic materials, which can recover after laser irradiation without affecting normal display function.

In addition, the pressure sensitive adhesive 2012, the first laminated film 2013, the polarizing layer 2014, the second laminated film 2015, the photochromic layer 2016, and the protective layer 2017 all belong to a conventional structure of polarizers and can be formed according to regular processes. The photochromic layer 2016 is disposed between the second laminated film 2015 and the protective layer 2017, or disposed in other feasible locations, and it is not limited thereto.

In addition, a plurality of scattered particles 204 are distributed on one side of the photochromic glass layer 201 away from the array substrate 202 to scatter passing lights.

A material of the scattered particles 204 comprises silica or polymethyl methacrylate.

It should be noted that, the display panel 20 mentioned above only shows the array substrate 202 and the color film substrate. These structural layers are only a brief description of a partial structure and components of the display panel, but are not limited thereto. For example, the color film substrate comprises a black matrix (BM), an RGB color resistance layer, etc., and the array substrate 202 comprises a TFT switch, a scanning line, a data line, a pixel electrode, a common electrode, etc. The display panel 20 further comprises other display component, such as an alignment film, a frame glue, etc. that are disposed between the array substrate 202 and the color film substrate. These details can be implemented by referring to the prior art, and are not described herein again.

In summary, the photochromic polarizer is used as a photochromic structure on a side of the color film substrate, so that the photochromic polarizer undergoes photochromic conversion under irradiation of ultraviolet laser. When the passing lights in the display panel 20 go through the photochromic glass 1011, the color change region filters the passing lights. Then, the passing lights go through the scattering particles 204 to form wide-angle visibility, thereby forming a visible laser point of laser pointers and achieving visible display of the laser pointers.

Embodiment 3

Figure 3:
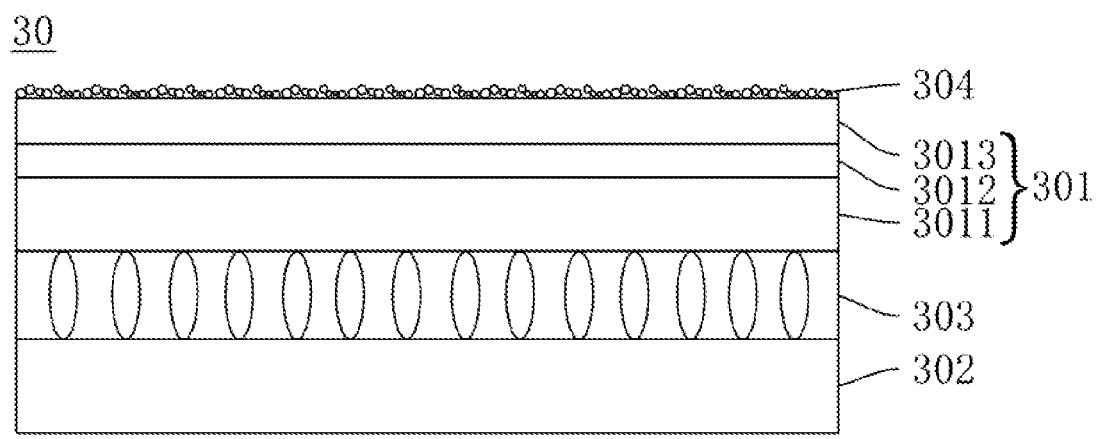
FIG. 3 is a schematic structural diagram of yet another display panel provided by an embodiment of the present disclosure.

Referring to FIG. 3, a display panel 30 comprises an array substrate 302 and a color film substrate relatively disposed, and a liquid crystal layer 303 disposed between the array substrate 302 and the color film substrate.

The display panel 30 further comprises a photochromic glass layer 301 disposed on the color film substrate.

The photochromic glass layer 301 comprises a glass substrate 3011, and a photochromic film 3012 and a polarizer 3013 sequentially disposed on one side of the glass substrate 3011 away from the array substrate 302.

Wherein, a material of the photochromic layer 2016 comprises an organic photochromic material or an inorganic photochromic material. The organic photochromic material comprises spiropyran, chlorpyrifos, or diarylethene, and the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

The photochromic materials are reversible photochromic materials, which can recover after laser irradiation without affecting normal display function.

In addition, a plurality of scattered particles 304 are distributed on one side of the photochromic glass layer 301 away from the array substrate 302 to scatter passing lights.

A material of the scattered particles 304 comprises silica or polymethyl methacrylate.

It should be noted that, the display panel 30 mentioned above only shows the array substrate 302 and the color film substrate. These structural layers are only a brief description of a partial structure and components of the display panel, but are not limited thereto. For example, the color film substrate comprises a black matrix (BM), an RGB color resistance layer, etc., and the array substrate 302 comprises a TFT switch, a scanning line, a data line, a pixel electrode, a common electrode, etc. The display panel 30 further comprises other display component, such as an alignment film, a frame glue, etc. that are disposed between the array substrate 302 and the color film substrate. These details can be implemented by referring to the prior art, and are not described herein again.

In summary, the photochromic film 3012 is used as a photochromic structure on a side of the color film substrate, so that the photochromic film 3012 undergoes photochromic conversion under irradiation of ultraviolet laser. When the passing lights in the display panel 30 go through the photochromic glass 1011, the color change region filters the passing lights. Then, the passing lights go through the scattering particles 304 to form wide-angle visibility, thereby forming a visible laser point of laser pointers and achieving visible display of the laser pointers.

Furthermore, an embodiment of the present disclosure provides a display device, and the display device comprises a display panel provided by the embodiment of the present disclosure. Wherein, a photochromic glass layer is disposed in the display device, and a color change region is formed when a laser irradiates the display device. The color change region filters passing lights. Then, the passing lights are scattered by scattering particles to form a wide-angle visible laser point. The display device provided by the embodiment of the present disclosure may be applied to conference-integrated machines, electronic whiteboards, and other display technologies.

As mentioned above, while the present disclosure has been disclosed via preferred embodiments as above, the preferred embodiments are not intended to limit the disclosure. Those skilled in the art can make various modifications and alternations without departing from the spirit and scope of the disclosure. The scope of protection of the disclosure is defined by the claims.

What is claimed is:

1. A display panel, comprising:
   an array substrate;
   a color film substrate disposed on the array substrate;
   a photochromic glass layer disposed on the color film substrate and recovering after laser irradiation, wherein a color change region is formed when an ultraviolet laser irradiates the photochromic glass layer; and
   a plurality of scattered particles distributed on the photochromic glass layer,
   wherein the photochromic glass layer comprises a glass substrate, and a photochromic polarizer attached to one side of the glass substrate away from the array substrate, and
   wherein the photochromic polarizer comprises a pressure sensitive adhesive, a first laminated film, a polarizing layer, a second laminated film, a photochromic layer, and a protective layer sequentially disposed on the glass substrate.

2. The display panel as claimed in claim 1, wherein the scattered particles are disposed on a surface of one side of the photochromic glass layer facing away from the array substrate, and a material of the scattered particles comprises silica or polymethyl methacrylate.

3. The display panel as claimed in claim 1, wherein a material of the photochromic layer comprises an organic photochromic material or an inorganic photochromic material;
   wherein, the organic photochromic material comprises spiropyran, chlorpyrifos, or diarylethene,
   wherein, the inorganic photochromic material comprises tungsten trioxide, molybdenum trioxide, titanium dioxide, cerium-doped calcium fluoride crystals, mixed crystals of calcium iodide and mercury iodide, copper chloride, or silver chloride.

\* \* \* \* \*